United States Patent
Nakamura et al.

(10) Patent No.: US 8,637,604 B2
(45) Date of Patent: *Jan. 28, 2014

(54) BLOCK COPOLYMER AND METHOD FOR PRODUCING SAME, COMPOSITION FOR RESIN MODIFICATION AND MODIFIED RESIN COMPOSITION, AND METHOD FOR PRODUCING SAME

(75) Inventors: Masao Nakamura, Tokyo (JP); Kazuya Ito, Tokyo (JP); Hidenori Yamagishi, Tokyo (JP)

(73) Assignee: Zeon Corporation, Tokyo (JP)

( * ) Notice: Subject to any disclaimer, the term of this patent is extended or adjusted under 35 U.S.C. 154(b) by 501 days.

This patent is subject to a terminal disclaimer.

(21) Appl. No.: 11/989,635

(22) PCT Filed: Jul. 27, 2006

(86) PCT No.: PCT/JP2006/314835
§ 371 (c)(1),
(2), (4) Date: Jan. 29, 2008

(87) PCT Pub. No.: WO2007/013541
PCT Pub. Date: Feb. 1, 2007

(65) Prior Publication Data
US 2009/0149578 A1   Jun. 11, 2009

(30) Foreign Application Priority Data
Jul. 29, 2005   (JP) ................. 2005-221677

(51) Int. Cl.
C08F 297/04   (2006.01)
C08L 53/02   (2006.01)
C08L 51/04   (2006.01)

(52) U.S. Cl.
USPC .............. 525/71; 525/98; 525/99; 525/271

(58) Field of Classification Search
USPC .................. 525/71, 98, 99, 271
See application file for complete search history.

(56) References Cited

U.S. PATENT DOCUMENTS

| | | |
|---|---|---|
| 4,110,500 A | 8/1978 | Evans et al. |
| 4,433,109 A | 2/1984 | Takeuchi et al. |
| 4,940,756 A * | 7/1990 | Broekhuis et al. ............ 525/237 |
| 5,011,888 A * | 4/1991 | Tsutsumi et al. ............... 525/98 |
| 5,096,973 A | 3/1992 | Herrmann et al. |
| 5,461,095 A * | 10/1995 | Van Dongen et al. ........ 524/100 |
| 5,658,987 A * | 8/1997 | Nakamura et al. ............. 525/99 |
| 6,031,053 A | 2/2000 | Knoll et al. |
| 6,180,717 B1 | 1/2001 | Kawazura et al. |
| 6,355,728 B1 | 3/2002 | Kawazura et al. |
| 6,369,160 B1 * | 4/2002 | Knoll et al. ..................... 525/89 |
| 2003/0211308 A1 * | 11/2003 | Khandpur et al. ......... 428/317.3 |
| 2009/0318597 A1 * | 12/2009 | Squire et al. .................. 524/261 |

FOREIGN PATENT DOCUMENTS

| | | |
|---|---|---|
| DE | 44 20 952 A1 | 12/1995 |
| EP | 1 270 625 A1 | 1/2003 |
| JP | 5-331247 A | 12/1993 |
| JP | 9-255716 A | 9/1997 |
| JP | 10-36465 A | 2/1998 |
| JP | 10-204136 A | 8/1998 |
| JP | 10-265537 A | 10/1998 |

* cited by examiner

*Primary Examiner* — Jeffrey Mullis
(74) *Attorney, Agent, or Firm* — Birch, Stewart, Kolasch & Birch, LLP

(57) ABSTRACT

A block copolymer comprising at least one polymer block A comprising conjugated diene monomer units, and at least one polymer block B comprising conjugated diene monomer units and aromatic vinyl monomer units. This block copolymer is characterized in that (1) the polymer block A has a glass transition temperature of −88° C. to −45° C., (2) the polymer block B has a glass transition temperature of 30° C. to 90° C., (3) the content of aromatic vinyl monomer units in the whole block copolymer is 3-52 wt. %, (4) the aromatic vinyl block ratio in the whole block copolymer is smaller than 69 wt. %, and (5) the viscosity of a 5 wt. % solution of the block copolymer in styrene is 30-80 mPa·s. The block copolymer is useful as a resin modifier.

31 Claims, No Drawings

US 8,637,604 B2

BLOCK COPOLYMER AND METHOD FOR PRODUCING SAME, COMPOSITION FOR RESIN MODIFICATION AND MODIFIED RESIN COMPOSITION, AND METHOD FOR PRODUCING SAME

TECHNICAL FIELD

This invention relates to a block copolymer and a process for producing the same, a composition for resin modification, and a modified resin composition and a process for producing the same. More particularly, this invention relates to (1) a block copolymer which can be produced with enhanced productivity, and, when using as a resin modifier, it can give a composition for resin modification having good impact resistance, transparency and luster, and a process for producing the block copolymer; (2) a composition for resin modification comprising the block copolymer; and (3) a modified resin composition comprising the composition for resin modification, and a process for producing the modified resin composition.

BACKGROUND ART

A high impact polystyrene resin (HIPS) is a polystyrene resin having incorporated therein a rubbery polymer such as a conjugated diene polymer, which exhibits improved impact resistance. As the high impact polystyrene resin has good impact resistance, transparency, luster, rigidity and shapability, and is inexpensive, it is widely used for electrical equipments, office appliances, packaging containers and sundry goods.

A polybutadiene rubber is most popularly used as a resin-modifier for the preparation of the high impact polystyrene resin. To more improve the impact resistance, transparency and luster of the high impact polystyrene resin, the incorporation of block copolymers have been proposed in, for example, Japanese Unexamined Patent Publication (hereinafter abbreviated to "JP-A") S63-48317, JP-A S64-74208, JP-A H1-172413, JP-A 2002-179715 and JP-A 2003-48926.

The block copolymers proposed in these patent publications easily become powdery and have poor handling characteristics, and are difficult to be shaped into, for example, bales. To solve these problems, a resin-modifying composition comprising an aromatic vinyl-conjugated diene block copolymer, the block aromatic vinyl portion of which has a relatively small molecular weight, and which has as the whole a relatively large molecular weight and a relatively narrow molecular weight distribution, has been proposed in JP-A H10-204136. A rubbery polymer composition comprising an aromatic vinyl-conjugated diene block copolymer and a conjugated diene homopolymer, which has been made by a special process, has been proposed as a resin-modifier in JP-A H5-331247. A radial block copolymer comprising a combination of two kinds of polymer segments having specific glass transition temperatures is known as a resin-modifier (see JP-A S64-79251).

DISCLOSURE OF THE INVENTION

Problems to be Solved by the Invention

The aromatic vinyl-conjugated diene block copolymer proposed in JP-A H10-204136 exhibits good shapability to bales, but it still easily becomes powdery and has poor handling characteristics. The rubbery polymer composition proposed in JP-A H5-331247 also exhibits good shapability to bales, but the problem of easily becoming powdery has not completely been solved and further improvement is desired.

According to the study made by the present inventors, a part of the radial block copolymers proposed in JP-A S64-79251 does not easily become powdery and exhibits good shapability to bales, but, a high impact polystyrene resin having incorporated therein the radial block copolymer as a resin-modifier has insufficient impact resistance and luster.

An object of the present invention is to provide a block copolymer which does not easily become powdery in the course of production and has good shapability to bales and other articles, and thus, can be produced with enhanced productivity, and, when using as a resin modifier, it can give a modified resin composition having good impact resistance, transparency and luster, and a process for producing the block copolymer.

Another object of the present invention is to provide a composition for resin modification comprising the block copolymer, and a modified resin composition comprising the composition for resin modification, and a process for producing the modified resin composition.

Means for Solving the Problems

The present inventors made extensive research and found that the above-mentioned objects can be achieved by a block copolymer comprising a combination of two kinds of blocks having specific monomers units and specific different glass transition temperatures, which block copolymer has a specific content of aromatic vinyl monomer units, a specific aromatic vinyl block ratio, a specific aromatic vinyl block ratio and a specific viscosity of 5% solution in styrene. Based on this finding, the present invention has been completed.

In one aspect of the present invention, there is provided a block copolymer comprising polymer block or blocks A comprising conjugated diene monomer units, and polymer block or blocks B comprising conjugated diene monomer units and aromatic vinyl monomer units, said block copolymer satisfies the following requirements:
(1) the polymer block or blocks A have a glass transition temperature in the range of −88° C. to −45° C.,
(2) the polymer block or blocks B have a glass transition temperature in the range of 30° C. to 90° C.,
(3) the content of aromatic vinyl monomer units in the whole block copolymer is in the range of 3% to 52% by weight based on the weight of the block copolymer,
(4) the aromatic vinyl block ratio in the whole block copolymer is smaller than 69% by weight, and
(5) the viscosity of a solution of the block copolymer in styrene with a concentration of 5% by weight is in the range of 30 to 80 mPa·s.

In another aspect of the present invention, there is provided a process for producing the above-mentioned block copolymer, which comprises the steps of polymerizing monomers for forming one of the polymer block or blocks A and the polymer block or blocks B in the presence of a polymerization initiator, and then, adding monomers for forming the other of the polymer block or blocks A and the polymer block or blocks B to a polymerization system, followed by polymerization thereof.

Preferably the polymerization in the above-mentioned process for producing the block copolymer is carried in the presence of a Lewis base. A preferable process for producing the block copolymer comprises the steps of polymerizing monomers for forming the polymer block or blocks A in the presence of a Lewis base compound, and then, adding an additional Lewis base compound and monomers for forming the polymer block or blocks B to the polymerization system, followed by polymerization thereof.

In a still another aspect of the present invention, there is provided a resin-modifying composition, which comprises the above-mentioned block copolymer.

In a further aspect of the present invention, there is provided a modified resin composition comprising the above-mentioned resin-modifying composition and a substrate resin.

In a further aspect of the present invention, there is provided a process for producing the above-mentioned modified resin composition, which comprises polymerizing a monomer for forming the substrate resin in the presence of the above-mentioned resin-modifying composition.

Effect of the Invention

The block copolymer according to the present invention does not easily become powdery in the production process and has good shapability to bales and other articles, and thus, can be produced with enhanced productivity, and, when using as a resin modifier, it can give a modified resin composition having good impact resistance, transparency and luster.

BEST MODE FOR CARRYING OUT THE INVENTION

The block copolymer according to the present invention comprises at least two kinds of polymer blocks, namely, polymer block A and polymer block B.

One kind of polymer block (i.e., polymer block A) among the polymer blocks constituting the block copolymer of the present invention comprises at least conjugated diene monomer units and has a glass transition temperature in the range of −88° C. to −45° C.

The monomers used for forming the conjugated diene monomer units in the polymer block A are not particularly limited provided that they are conjugated diene monomers. As specific examples thereof, there can be mentioned 1,3-butadiene, 2-methyl-1,3-butadiene (i.e., isoprene), 2,3-dimethyl-1,3-butadiene, 2-chloro-1,3-butadiene, 1,3-pentadiene and 1,3-hexadiene. Of these, 1,3-butadiene and 2-methyl-1,3-butadiene are preferably used. 1,3-Butadiene is especially preferable. These conjugated diene monomers may be used either alone or as a combination of at least two thereof.

The polymer block A may comprise other monomer units in addition to the conjugated diene monomer units. Especially, in the case when the conjugated diene monomer for forming the polymer block A is used alone, the monomer is incapable of forming polymer block or blocks A having a glass transition temperature in the range of −88° C. to −45° C., said monomer must be used in combination with other monomer for forming the polymer block or blocks A. The monomer to be used in combination with the conjugated diene monomer is not particularly limited, but, it is preferable to use an aromatic vinyl monomer or a combination of monomers comprising an aromatic vinyl monomer.

The aromatic vinyl monomer optionally used in combination with the conjugated diene monomer for forming the polymer block or blocks A include, for example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methyylstyrene, 2-chlorostyrene, 3-chlorostyrene, 4-chlorostyrene, 4-bromostyrene, 2-methyl-4,6-dichlorostyrene, 2,4-dibromstyrene and vinylnaphthalene. Of these, styrene, α-methylstyrene and 4-methylstyrene are preferably used. These aromatic vinyl monomers may be used either alone or as a combination of at least two thereof.

The ratio of the conjugated diene monomer units to aromatic vinyl monomer units in the polymer block or blocks A can appropriately be chosen, but, the ratio by weight of conjugated diene monomer units/aromatic vinyl monomer units is usually in the range of 100/0 to 15/85, preferably 95/5 to 30/70 and more preferably 90/10 to 60/40.

The monomers which may be used optionally in combination with the conjugated diene monomer and the optional aromatic vinyl monomer include, for example, α,β-unsaturated nitrites such as acrylonitrile and methacrylonitrile; unsaturated carboxylic acids and their anhydrides such as acrylic acid, methacrylic acid and maleic anhydride; unsaturated carboxylic acid esters such as methyl methacrylate, ethyl acrylate and butyl acrylate; and non-conjugated diene monomers such as 1,5-hexadiene, 1,6-heptadiene, 1,7-octadiene, dicyclopentadiene and 5-ethylidene-2-norbornene. These optional monomers can be used preferably in an amount of 0% to 25% by weight, more preferably 0% to 10% by weight, based on the weight of the polymer block or blocks A. In the case when the polymer block or blocks A comprises two or more different monomer units, the bonding fashion of the different monomers is not particularly limited.

The polymer block or blocks A must have a glass transition temperature in the range of −88° C. to −45° C. The glass transition temperature is preferably in the range of −88° C. to −50° C. If the glass transition temperature of the polymer block or blocks A is too low, the block copolymer easily becomes finely divided. In contrast, if the glass transition temperature thereof is too high, when the block polymer is incorporated with a resin, it gives a modified resin composition having poor impact resistance, transparency and luster.

Another polymer block or blocks of the block copolymer according to the present invention (i.e., polymer block or blocks B) comprise at least conjugated diene monomer units and aromatic vinyl monomer units, and have a glass transition temperature in the range of 30° C. to 90° C.

The monomer used for forming the conjugated diene monomer units in the polymer block or blocks B is not particularly limited, provided that it is a conjugated diene monomer. As specific examples of the diene monomer, there can be mentioned those which are recited as the conjugated diene monomer used for forming the conjugated diene monomer units in the polymer block or blocks A. Of the conjugated diene monomers, 1,3-butadiene and 2-methyl-1,3-butadiene are preferable. 1,3-Butadiene is especially preferable. These conjugated diene monomers may be used either alone or as a combination of at least two thereof.

The monomer used for forming the conjugated diene monomer units in the polymer block or blocks B is not particularly limited, provided that it is a conjugated diene monomer. As specific examples of the diene monomer, there can be mentioned those which are recited as the conjugated diene monomer used for forming the conjugated diene monomer units in the polymer block or blocks A. Of the conjugated diene monomers, 1,3-butadiene and 2-methyl-1,3-butadiene are preferable. 1,3-Butadiene is especially preferable. These conjugated diene monomers may be used either alone or as a combination of at least two thereof.

The monomer used for forming the aromatic vinyl monomer units in the polymer block or blocks B is not particularly limited, provided that it is an aromatic vinyl monomer. As specific examples of the aromatic vinyl monomer, there can be mentioned those which are recited as the aromatic vinyl monomer used for forming the aromatic vinyl monomer units in the polymer block or blocks A. Of the aromatic vinyl monomers, styrene is preferable because the block copolymer gives a modified resin composition having a more enhanced transparency. The aromatic vinyl monomers may be used either alone or as a combination of at least two thereof.

The ratio of the conjugated diene monomer units to the aromatic vinyl monomer units in the polymer block or blocks B can be appropriately chosen, but the ratio by weight of the conjugated diene monomer units/the aromatic vinyl monomer units is usually in the range of 1/99 to 50/50, preferably 2/98 to 40/60, and more preferably 5/95 to 30/70.

The polymer block or blocks B may comprise monomer units other than the conjugated diene monomer units and the aromatic vinyl monomer units. Such other monomer units include, for example, those which are recited as other monomers used in combination with the conjugated diene monomer units and the aromatic vinyl monomer units for the polymer block or blocks A.

The amount of such other monomer units is preferably in the range of 0 to 25% by weight, more preferably 0 to 10% by weight, based on the weight of the polymer block or blocks B.

No limitation is imposed to the bonding fashion of the whole monomer units in the polymer block or blocks B.

The polymer block or blocks B must have a glass transition temperature in the range of 30° C. to 90° C. The glass transition temperature is preferably 40° C. to 80° C., more preferably 50° C. to 75° C. If the glass transition temperature of the polymer block or blocks B is too low, coagulation in the production of the block copolymer is insufficient, and the block copolymer gives a modified resin composition having poor luster and transparency. In contrast, if the glass transition temperature of the polymer block or blocks B is too high, the block copolymer easily becomes powdery in the course of production and has poor shapability to bales and other articles, and is liable to be easily gelled, and thus, when using as a resin modifier, the block copolymer gives a modified resin composition having poor impact resistance.

The block copolymer according to the present invention comprises at least one polymer block A and at least one polymer block B. The block copolymer may comprise two or more polymer blocks A and two or more polymer blocks B. The block copolymer may comprise polymer block or blocks other than the polymer block A and polymer block B. Such other polymer blocks are not particularly limited, and include, for example, a polymer block having a glass transition temperature higher than 90° C., a polymer block having a glass transition temperature higher than −45° C. but lower than 30° C., a polymer block having a glass transition temperature lower than −88° C., and a polymer block having a glass transition temperature in the range of 30° C. to 90° C. but not comprising the conjugated diene monomer units and/or the aromatic vinyl monomer units.

The bonding fashion between the polymer blocks in the block copolymer according to the present invention is not particularly limited, and the block copolymer can be, for example, straight chainlike, comb-like or star-like. However, the block copolymer is preferably a straight chain block copolymer represented by the following general formula (1) or (2):

A-B                general formula (1)

wherein A represents polymer block A, and B represents polymer block B,

A-(X$_i$)$_n$—B          general formula (2)

wherein A represents polymer block A, B represents polymer block B, X$_i$ represents a polymer block comprised only of conjugated diene monomer units or aromatic vinyl monomer units, and n is an integer in the range of 1 to 10. The straight chain block copolymer of the formula (1) is especially preferable because particle diameter of the block copolymer in a substrate resin can be easily controlled. In the block copolymer of the formula (2), the ratio of [the sum of weight of polymer block A plus weight of polymer block B] to [the total weight of n polymer blocks Xi] is preferably at least 1, especially preferably at least 4.

In the block copolymer of the present invention, the ratio of the weight of polymer block A to the weight of polymer block B (in the case when the block copolymer comprises two or more polymer blocks A and/or two or more polymer blocks B, said ratio refers to the ratio of the total weight of polymer blocks A to the total weight of polymer blocks B) is preferably in the range of 0.43 to 9.0, more preferably 1.0 to 4.0. When this ratio is too large, the resulting modified resin composition is liable to have poor impact resistance. In contrast, when this ratio is too small, the block copolymer tends to easily become powdery.

In the block copolymer of the present invention comprised of the above-mentioned blocks, the content of aromatic vinyl monomer units in the whole block copolymer must be in the range of 3% to 52% by weight based on the weight of the block copolymer, and the aromatic vinyl block ratio in the whole block copolymer must be smaller than 69% by weight.

The content of aromatic vinyl monomer units in the whole block copolymer is in the range of 3% to 52% by weight, preferably at least 20% by weight but smaller than 42% by weight, based on the weight of the block copolymer. When the content of aromatic vinyl monomer units in the whole block copolymer is in this range, the block copolymer exhibits good shapability to bales and other articles, and, when using as a resin modifier, it can give a modified resin composition having good and well-balanced impact resistance, transparency and luster.

The content of conjugated diene monomer units in the whole block copolymer of the present invention is preferably in the range of 48% to 97% by weight, more preferably larger than 58% by weight but not larger than 80%, based on the weight of the block copolymer.

The content of monomer units other than the conjugated diene monomer units and the aromatic vinyl monomer units is not particularly limited, but is preferably not larger than 49% by weight, more preferably not larger than 25% by weight, and especially preferably 10% by weight, based on the weight of block copolymer.

The aromatic vinyl block ratio in the whole block copolymer according to the present invention must be smaller than 69% by weight, preferably smaller than 65% by weight, and more preferably smaller than 50% by weight. If the block copolymer has a too high aromatic vinyl block ratio, shapability of the block copolymer to bales and other articles becomes poor, and, when the block copolymer as a resin modifier is incorporated in a substrate resin, the resulting modified resin composition has poor impact resistance. The lower limit of the aromatic vinyl block ratio in the whole block copolymer is not particularly limited, but is usually 5% by weight, preferably 10% by weight and more preferably 25% by weight. When the aromatic vinyl block ratio is too small, the resulting modified-resin composition tends to have poor luster and transparency. By the term "aromatic vinyl block ratio" as used herein, we mean the ratio of (a)/(b) by weight, wherein (a) is a weight of the aromatic vinyl monomer units forming a chain consisting only of aromatic vinyl monomer units and having a molecular weight of at least about 1,000, and (b) is a weight of the whole aromatic vinyl monomer units in the block copolymer. More specifically the aromatic vinyl block ratio is measured by the osmiamate ion decomposition method described in I. M. Kolthoff et al, J. Polym. Sci., 1, 429 (1948).

The conjugated diene monomer units in the whole block copolymer of the present invention preferably have a vinyl bond content (the sum of a 1,2-vinyl bond content plus a 3,4-vinyl bond content) of not larger than 50%, more preferably not larger than 30% and especially preferably not larger than 15%, based on the whole conjugated diene monomer units, because, when the block copolymer having the above-mentioned vinyl bond content is used as a resin modifier, the resulting resin composition exhibits more enhanced impact resistance.

The block copolymer according to the present invention must have a viscosity in the range of 30 to 80 mPa·s as measured on a solution in styrene with a concentration of 5% by weight. The viscosity of 5 weight % solution in styrene is preferably in the range of 33 to 50 mPa·s. If the viscosity of 5 weight % solution in styrene is too high, a modified resin composition comprising the block copolymer becomes difficult to produce from the block copolymer.

The block copolymer according to the present invention preferably has a weight average molecular weight (Mw) in the range of 210,000 to 500,000, more preferably 250,000 to 450,000 and especially preferably 300,000 to 400,000 as expressed in terms of that of polystyrene as measured by gel permeation chromatography using a differential refractometer. When the molecular weight of the block copolymer is too small, a modified resin composition comprising the block copolymer tends to have poor impact resistance. In contrast, when the molecular weight of the block copolymer is too large, the viscosity of a solution of the block copolymer in a solvent tends to be too high to handle without any trouble in the production process of the block copolymer.

The block copolymer preferably has a molecular weight distribution as defined by a ratio (Mw/Mn) of weight average molecular weight (Mw) to number average molecular weight (Mn) in the range of 1.0 to 1.5, wherein Mw and Mn are expressed in terms of those of polystyrene as measured by gel permeation chromatography using a differential refractometer. When the molecular weight distribution of the block copolymer is too broad, a modified resin composition comprising the block copolymer tends to have poor impact resistance.

The block aromatic vinyl portion in the block copolymer of the present invention preferably has a weight average molecular weight in the range of 1,000 to 70,000, more preferably 2,000 to 20,000 and especially preferably 6,000 to 17,000 as expressed in terms of that of polystyrene as measured by gel permeation chromatography using a differential refractometer. When the block aromatic vinyl portion in the block copolymer has a too low molecular weight, a modified resin composition comprising the block copolymer tends to have poor luster. In contrast, when the block aromatic vinyl portion in the block copolymer has a too high molecular weight, the block copolymer tends to easily become powdery in the process of production and have poor shapability to bales.

The block aromatic vinyl portion in the block copolymer of the present invention preferably has a molecular weight distribution in the range of 1.5 to 3.0, more preferably 1.8 to 2.5 and especially preferably 1.9 to 2.5, as defined by a ratio (Mw/Mn) of weight average molecular weight (Mw) to number average molecular weight (Mn).

The weight average molecular weight and the molecular weight distribution of the block aromatic vinyl portion is determined on a fraction obtained by filtration in the above-mentioned osmiamate ion decomposition method and expressed in terms of those of polystyrene as measured by gel permeation chromatography using a differential refractometer.

Mooney viscosity ($ML_{1+4}$, 100° C.) of the block copolymer of the present invention is not particularly limited, but it is usually in the range of 50 to 140, preferably 70 to 130 and more preferably 80 to 120. When the Mooney viscosity is too small, the block copolymer tends to have poor shapability to bales or other articles. In contrast, when the Mooney viscosity is too high, the block copolymer tends to easily become powdery.

The block copolymer according to the present invention can be produced by the same process as adopted for the production of the conventional block copolymers. That is, the block copolymer is produced by a process comprising the steps of polymerizing monomers for forming one of the polymer block or blocks A and the polymer block or blocks B in the presence of a polymerization initiator, and then, adding monomers for forming the other of the polymer block or blocks A and the polymer block or blocks B to a polymerization system, followed by polymerization thereof. In this production process, an additional step of adding and polymerizing monomers for forming a polymer block or blocks, other than the polymer block or blocks A and the polymer block or blocks B, can be carried out, if desired, prior to or after the above-mentioned two steps of polymerization, or between the above-mentioned two steps of polymerization.

The polymerization initiator used for the production of the block copolymer of the present invention can be chosen from the initiators which are known as exhibiting an anion polymerization activity for conjugated diene monomers is selected from the group consisting of an organic alkali metal compound, an organic alkaline earth metal compound, and a complex catalyst containing an organic lanthanoid rare earth metal compound.

The organic alkali metal compound especially preferably includes an organic alkali metal compound containing at least one lithium atom in the molecule, and, as specific examples thereof, there can be mentioned organic monolithium compounds such as ethyllithium, n-propyllithium, isopropyllithium, n-butyllithium, sec-butyllithium, t-butyllithium, hexyllithium, phenyllithium, stilbenelithium, dialkylaminolithium, diphenylaminolithium and ditrimethylsilylaminolithium; organic dilithium compounds such as methylenedilithium, tetramethylenedilithium, hexamethylenedilithium, isoprenyllithium and 1,4-dilithio-ethylcyclohexane; and organic trilithium compounds such as 1,3,5-trilithiobenzene. Of these, organic monolithium compounds are preferable.

As specific examples of the organic alkaline earth metal compound, there can be mentioned n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

As specific examples of the complex catalyst containing organic lanthanoid rare earth metal compound, there can be mentioned complexes consisting of neodymium, samarium and/or gadolinium-containing lanthanoid series rare earth metal compounds/alkylaluminum/alkylaluminum halide/alkylaluminum hydride.

Polymerization initiators which are capable of forming a uniform solution in an organic solvent and exhibit an activity for living polymerization, such as metalocene catalysts containing titanium, vanadium, samarium or gadolinium, can also be used.

The polymerization initiators may be used either alone or as a combination of at least two thereof.

The amount of polymerization initiator can be appropriately determined depending upon the target molecular weight of the block copolymer and is not particularly limited. However, the amount of polymerization initiator is usually in the range of 0.01 to 20 milli-moles, preferably 0.05 to 15 milli-moles and more preferably 0.1 to 10 milli-moles, based on 100 g of the total monomers used for the production of the block copolymer.

The solvent used for polymerization is not particularly limited provided that it is inert for the polymerization initiator, and includes, for example, chain-like hydrocarbon solvents, cyclic hydrocarbon solvents and mixtures thereof. As specific examples of the solvent, there can be mentioned chain-like hydrocarbon solvents, i.e., chain-like alkanes and alkenes having 4 or 5 carbon atoms, such as n-butane, isobutene, 1-butene, isobutylene, trans-2-butene, cis-2-butene, 1-pentene, trans-2-pentene, cis-2-pentene, n-pentane, isopentane and neopentane; cyclic hydrocarbon solvents including aromatic compounds such as benzene, toluene and xylene, and aliyclic hydrocarbon compounds such as cyclopentane and cyclohexane. These solvents may be used either alone or as a combination of at least two thereof.

The amount of solvent used for polymerization is not particularly limited, but it is preferably such that the polymerization solution as obtained by polymerization contains a block copolymer at a concentration in the range of 5 to 50% by weight, more preferably 10 to 40% by weight and especially preferably 20 to 30% by weight.

To avoid the undesirable production of polymers with a low molecular weight due to a chain transfer reaction, it is preferable that incorporation in a polymerization vessel of polymerization-inhibiting substances such as 1,2-butadiene and acetylenes contained as impurities in the solvent or the conjugated diene monomer is minimized to utmost extent. The amount of such polymerization-inhibiting substances should be usually not larger than 200 ppm, preferably not larger than 100 ppm and more preferably not larger than 20 ppm within the polymerization vessel.

In the process for producing the block copolymer, a Lewis base compound is preferably incorporated in the reaction vessel to control the structure of each polymer block in the block copolymer. As specific examples of the Lewis base compound, there can be mentioned ethers such as tetrahydrofuran, diethyl ether, dioxane, ethyleneglycol dimethyl ether, ethyleneglycol dibutyl ether, diethyleneglycol dimethylether and diethyleneglycol dibutylether; tertiary amines such as tetramethylethylenediamine, trimethylamine, triethylamine, pyridine and quinuclidine; alkali metal alkoxides such as potassium-t-amyl oxide and potassium-t-butyl oxide; and phosphines such as triphenylphosphine. These Lewis base compounds can be appropriately chosen depending upon the particular object of the present invention, and they may be used either alone or as a combination of at least two thereof.

A preferable process for producing the block copolymer using a Lewis base compound comprises the steps of polymerizing monomers for forming the polymer block or blocks A in the presence of a Lewis base compound using a polymerization initiator, and then, adding an additional Lewis base compound and monomers for forming the polymer block or blocks B to the polymerization system, followed by polymerization thereof. According to this preferable production process, a relatively small amount of the Lewis base compound is present at the step of polymerization for forming the polymer block or blocks A, and a relatively large amount of the Lewis base compound is present at the step of polymerization for forming the polymer block or blocks B, and consequently, the content of vinyl bond in the portion of conjugated diene monomer units in the polymer block or blocks A can be lowered, and the content of aromatic vinyl block ratio in the polymer block or blocks B can be lowered. The resulting block copolymer becomes powdery only to a extremely reduced extent in the production process, and, when using as a resin modifier, it can give a modified resin composition having more enhanced impact resistance.

The order in which the additional Lewis base compound and the monomers for forming the polymer block or blocks B are added into the reaction vessel is not particularly limited. However, it is preferable that, after commencement of addition of the monomers for forming the polymer block or blocks B, addition of the additional Lewis base compound is commenced. By allowing the polymerization for forming the polymer block or blocks B to commence, prior to the addition of the additional Lewis base compound, undesirable side reactions such as polymerization termination reaction or chain transfer reaction, which are liable to occur due to the addition of Lewis base compound, can be avoided. In this process, the addition of the additional Lewis base compound is preferably allowed to commence after 1 to 30 minutes, more preferably 2 to 15 minutes elapse from the commencement of the addition into the reaction vessel of monomers for forming the polymer block or blocks B.

The amount of Lewis base compound added into the reaction vessel can be chosen appropriately according to the need. When the polymerization of monomers for forming the polymer block or blocks A is allowed to commence, 0.001 to 0.5 mole of a Lewis base compound per mole of the active terminal of polymerization initiator is preferably added. When the polymerization of monomers for forming the polymer block or blocks B is allowed to commence, 0.1 to 10 moles of a Lewis base compound per mole of the active terminal of polymerization initiator is preferably further added into the reaction vessel.

The polymerization temperature for the production of the block copolymer is generally in the range of 10 to 150° C., preferably 30 to 130° C., and more preferably 40 to 90° C. The polymerization time varies depending upon the other conditions, but, is usually within 48 hours, especially preferably 0.5 to 10 hours. In the case when the polymerization temperature is difficult to control, a reaction vessel equipped with a reflux condenser is preferably used for controlling the polymerization temperature by reflux cooling. The polymerization is preferably carried out in an atmosphere of inert gas such as nitrogen gas. The polymerization pressure is not particularly limited provided that the monomers and the solvent can be maintained in a liquid phase in the above-mentioned polymerization temperature range.

After completion of the polymerization, a polymerization stopper such as water, methanol, ethanol, propanol, hydrochloric acid or citric acid; a heat stabilizer; an extender such as a mineral process oil or synthetic process oil; and a neutralizing agent are added to the polymerization solution, according to the need. Then a block copolymer is recovered from the solution. As the method of recovering the block copolymer, conventional methods can be adopted which include, for example, a direct drying method for removing a solvent from the copolymer solution, and a steam stripping method for separating the polymer.

In the case when the block copolymer is collected as slurry by steam stripping, the collected slurry is usually dehydrated by an appropriate dehydrator such as an extrusion-type squeezer to give a crumb having a water content of the predetermined level or lower. Then the crumb is dried by an appropriate dryer such as a band dryer or a expansion extrusion dryer. The block copolymer of the present invention does not easily become powdery at the step of drying and has good handling characteristics, as compared with the block copolymers conventionally used as a resin modifier. The thus-obtained dried crumb of block copolymer can be shaped into, for example, bales by a bale molding machine. The block copolymer of the present invention exhibits good shapability as compared with the rubbery polymers conventionally used as a resin modifier.

The block copolymer according to the present invention does not easily become powdery in the production process and has good shapability to bales and other articles, and thus, can be produced with enhanced productivity, and, when using as a resin modifier, it can give a modified resin composition having good impact resistance, transparency and luster. Therefore, the block copolymer is especially suitable as a resin modifier.

A resin-modifying composition according to the present invention comprises the above-mentioned block copolymer, and is blended with a substrate resin for modification of the resin. The resin-modifying composition of the present invention may comprise ingredients other than the block copolymer. Such ingredients are not particularly limited and include those which have been hitherto used for resin-modifying compositions, such as a heat stabilizer, a plasticizer, a lubricant, a ultraviolet absorber, a colorant, a pigment, a release agent, an antistatic agent and a fire retardant. Of these, a heat stabilizer is preferably used. The resin-modifying composition can consist only of the block copolymer provided that it can be used for resin modification.

The heat stabilizer capable of being incorporated in the resin-modifying composition of the present invention is not particularly limited, and includes, for example, phosphite compound stabilizers, phosphonite compound stabilizers, acrylate compound stabilizers, phenolic compound stabilizers and amine compound stabilizers. These heat stabilizers may be used either alone or as a combination of at least two thereof.

The resin-modifying composition of the present invention preferably contains a heat stabilizer comprised of a phosphite compound containing at least two phosphorus atoms in the molecule. By the incorporation of a phosphite compound heat stabilizer containing at least two phosphorus atoms in the molecule, the resin-modifying composition exhibits enhanced stability in the production process and at storage. By incorporating the resin-modifying composition in a substrate resin, a modified resin composition having good luster, color tone and transparency and having reduced fish eyes.

As specific examples of the phosphite compound heat stabilizer containing at least two phosphorus atoms in the molecule, there can be mentioned pentaeryhritol diphosphites which include dialkylpentaerythritol diphosphites such as di(tridecyl)pentaerythritol diphosphite and distearylpentaerythritol diphosphite; and diarylpentaeryhritol diphosphites such as di(nonylphenyl)pentaerythritol diphosphite, bis(2,4-di-t-butylphenyl)pentaeryhritol diphosphite, bis(2,6-di-t-butylphenyl)pentaeryhritol diphosphite, bis(2,6-di-t-butyl-4-methylphenyl)pentaeryhritol diphosphite, bis(2,4-di-t-butyl-6-methylphenyl)pentaeryhritol diphosphite, bis(2,6-di-t-butyl-4-isopropylphenyl)pentaeryhritol diphosphite, bis(2,6-di-t-butyl-4-sec-butylphenyl)-pentaeryhritol diphosphite and bis(2,4,6-tri-t-butylphenyl)-pentaeryhritol diphosphite; and tetra(tridecyl)-isopropylidenediphenyl diphosphite, tetra(tridecyl)-1,1,3-tris(2-methyl-5-t-butyl-4-hydroxyphenyl) butane diphosphite, tetra(mixed $C_{12}$-$C_{15}$ alkyl)-4,4'-isopropylidene-diphenyl diphosphite, tetra(tridecyl)-4,4'-butylidene-bis(2-t-butyl-5-methylphenyl)diphosphite, tetra(tridecyl)-4,4'-butylidenebis(3-methyl-6-t-butylphenol) diphosphite, bis(octylphenyl)-bis[4,4'-butylidenebis(3-methyl-6-t-butylphenol)-1,6-hexanediol diphosphite and tris [2-t-butyl-4-(3-t-butyl-4-hydroxy-5-methylphenylthio)-5-methylphenyl]phosphite. Of these phosphite compound heat stabilizers containing at least two phosphorus atoms in the molecule, those which are liquid at room temperature are preferably used. Further, those which have a molecular weight of at least 700, especially at least 800 are preferably used.

The amount of heat stabilizer (when two or more stabilizers are used, the total amount of the stabilizers) in the resin-modifying composition is usually in the range of 0.01 to 0.50 part by weight, preferably 0.02 to 0.30 part by weight and more preferably 0.03 to 0.25 part by weight, based on 100 parts by weight of the block copolymer. When the amount of stabilizer is within this range, the block copolymer within the resin-modifying composition exhibits good resistance to coloration and degradation and the resulting modified resin composition has good color tone, transparency and luster.

The resin-modifying composition of the present invention can be prepared by blending the above-mentioned block copolymer with various ingredients, and the blending method is not particularly limited. The ingredients are preferably added to the block copolymer-containing solution after polymerization but before coagulation of the solution, because the ingredients can be uniformly dispersed.

The modified resin composition according to the present invention comprise the above-mentioned resin-modifying composition and a substrate resin. The substrate resin used for the modified resin composition is not particularly limited, and includes, for example, an aromatic vinyl resin containing aromatic vinyl monomer units, and an olefin resin. As specific examples of the aromatic vinyl resin, there can be mentioned an acrylonitrile-acrylate-styrene resin, an acrylonitrile-ethylene-styrene resin, an acrylonitrile-styrene resin, an acrylonitrile-butadiene-styrene resin, a polystyrene resin, a high-impact polystyrene resin, a methyl methacrylate-butadiene-styrene resin, a methyl methacrylate-styrene resin and a methyl methacrylate-butyl acrylate-styrene resin. As specific examples of the olefin resin, there can be mentioned polyethylene and polypropylene. In addition to the aromatic vinyl resin and the olefin resin, the substrate resin includes, for example, polyphenylene ether, polyamide, polycarbonate, polyacetal and polyester. These substrate resins may be used either alone or as a combination of at least two thereof.

The substrate resin in the modified resin composition of the present invention preferably comprises aromatic vinyl monomer units, and especially preferably comprises further methyl acrylate units in view of more enhanced transparency.

The amount of the resin-modifying composition in the modified resin composition is such that the ratio of the block copolymer in the resin-modifying composition to the substrate resin is usually in the range of 2/98 to 25/75 by weight, preferably 3/97 to 20/80 by weight and more preferably 5/95 to 15/85 by weight. When the ratio of the block copolymer is too high, the modified resin composition tends to have poor luster, rigidity, weather resistance and hardness. In contrast, when the ratio of the substrate resin is too high, the modified resin composition tends to have poor impact resistance.

The process for producing the modified resin composition of the present invention is not particularly limited, and includes, for example, a process wherein the substrate resin and the resin-modifying composition are mixed together by an appropriate procedure, and a process wherein a monomer used for the preparation of the substrate resin (which monomer is hereinafter called as "monomer for resin" when appropriate) is polymerized in the presence of the resin-modifying composition. The latter process is preferable because a modified resin composition having excellent impact resistance can be obtained.

The mixing of the substrate resin with resin-modifying composition can be conducted by using mixing kneaders such as a single screw extruder or a multiple screw extruder such as a twin screw extruder, a Banbury mixer, a roll and a kneader. The mixing temperature is preferably in the range of 100 to 250° C.

In the process for polymerizing a monomer for resin in the presence of the resin-modifying composition, a liquid for polymerization is prepared by dissolving or dispersing the resin-modifying composition in the monomer for resin, and the liquid for polymerization is polymerized in a polymerization vessel. The polymerization procedure is not particularly limited, and any of bulk polymerization procedure, suspension polymerization procedure, solution polymerization procedure and emulsion polymerization procedure can be adopted.

In the bulk polymerization procedure, the resin-modifying composition is dissolved or dispersed in the monomer for resin, and, if desired, a molecular weight modifier and a lubricant are added to the resulting solution or dispersion. Then a polymerization initiator is added to the solution or dispersion, and the polymerization is carried out with stirring in an inert gas atmosphere. In the case when an aromatic vinyl monomer is polymerized by the bulk polymerization procedure, the polymerization temperature is preferably in the range of 60 to 200° C.

In the suspension polymerization procedure, the resin-modifying composition is dissolved or dispersed in the monomer for resin in the same manner as in the bulk polymerization procedure and, if desired, a molecular weight modifier and a lubricant are added to the resulting solution or dispersion. Then a polymerization initiator is added to the solution or dispersion, and the resulting solution is dispersed in an aqueous solution of a suspension stabilizer. The suspension polymerization is carried out while the suspension state is maintained. After completion of the polymerization, the polymer solution is thoroughly washed with water to remove the suspension stabilizer, and the modified resin composition is recovered. In the case when an aromatic vinyl monomer is polymerized by the suspension polymerization procedure, the polymerization is completed preferably at a polymerization temperature of 60 to 150° C.

In the solution polymerization procedure, the resin-modifying composition is dissolved or dispersed in the monomer for resin in the same manner as in the bulk polymerization procedure, and, if desired, a molecular weight modifier, lubricant and an organic solvent for controlling the viscosity are added to the resulting solution or dispersion. Then a polymerization initiator is added to the solution or dispersion, and the polymerization is carried out with stirring in an inert gas atmosphere. In the case when an aromatic vinyl monomer is polymerized by the solution polymerization procedure, the polymerization temperature is preferably in the range of 60 to 200° C.

A two stage polymerization procedure may be adopted wherein a bulk polymerization is carried out until about 10 to 50% of the monomer for resin is polymerized, and then, polymerization is continued by a suspension polymerization procedure or a solution polymerization procedure.

After completion of polymerization, coagulation and drying are carried out by the conventional methods to recover the modified resin composition.

When the substrate resin is thermoplastic, the modified resin composition of the present invention has a melt flow rate such that the lower limit thereof is preferably 0.1, more preferably 0.5 and the upper limit thereof is preferably 20, as measured according to JIS K6871 at 200° C. under a load of 5 kg. When the melt flow rate is within this range, the mixing and kneading can be easily conducted and the resin-modifying composition is uniformly dispersed and modification of substrate resin is well achieved.

The modified resin composition of the present invention can have various ingredients incorporated therein, which are conventionally used in the resin industry. The ingredients include, for example, a heat stabilizer, a mineral oil, fluid paraffin, an organic or inorganic filler, a weather stabilizer, a light stabilizer, a plasticizer, a lubricant, a ultraviolet absorber, a colorant, a pigment, a release agent, an antistatic agent and a fire retardant.

EXAMPLES

The invention will now be specifically described by the following reference examples, examples and comparative examples.

Parts and % are by weight unless otherwise specified.

The characteristics were determined by the following methods.

[Molecular Weight and Molecular Weight Distribution of Block Copolymer]

Molecular weights were expressed in terms of that of polystyrene as measured by gel permeation chromatography using tetrahydrofuran as carrier. More specifically, a high speed liquid chromatography apparatus HLC8220 (available from Tosoh Corporation), and two columns GMH-HR-H (available from Tosoh Corporation) were used. A differential refractometer and a ultraviolet visible spectrophotometer (detection wavelength 254 nm) were used as detectors. Measurement was made using 0.1 ml of a polymer solution in tetrahydrofuran with a concentration of 0.045% as a test sample. The volume rate inflow at measurement was 1 ml/min.

[Monomer Units Content in Block Copolymer and Vinyl Bond Content of Conjugated Diene Monomer Units Portion in Block Copolymer]

Measurement was made by proton NMR using a 400-MHz-NMR apparatus (available from JEOL Co.).

[Aromatic Vinyl Block Ratio (Styrene Block Ratio) in Block Copolymer]

Measurement was made by an osmiamate ion decomposition method.

[Molecular Weight and Molecular Weight Distribution of Block Aromatic Vinyl Portion in Block Copolymer]

Molecular weights were expressed in terms of that of polystyrene as measured by gel permeation chromatography using tetrahydrofuran as carrier on a test sample of a filtered fraction obtained by an osmiamate ion decomposition method. More specifically, a high speed liquid chromatography apparatus HLC8220 (available from Tosoh Corporation), two columns ZOLBAXPSM 1000 (available from Du Pont Co.) and one column ZOLBAXPSM 60S (available from Du Pont Co.) were used. A differential refractometer was used as a detector. Measurement was made using 0.1 ml of a solution in tetrahydrofuran of the above-mentioned filtered fraction with a concentration of 0.1% as a test sample. The volume rate in flow was 0.7 ml/min.

[Glass Transition Temperature of Polymer Block]

A test sample of block copolymer was measured using a differential Scan Calorimeter (available from Perkin-Elmer Corporation) under the following conditions. The temperature of test sample was elevated from room temperature (23° C.) to 120° C., maintained at 120° C. for 10 minutes, lowered to −120° C. (rate of lowering 100° C./min), maintained at −120° C. for 10 minutes, and then elevated to 150° C. (rate of elevation 60° C./min). Class transition temperature was measured as an average value at two medial points.

[Viscosity of 5% Styrene Solution of Block Copolymer]

Measurement was made by Ostwald viscometer at 25° C.

[Occurrence of Finely Divided Powder]

A block copolymer sample was dried by an expansion extrusion dryer. The state of sample extruded from a die head of the dryer within a warm air dryer was visually observed, and evaluated according to the following four ratings.

A: Occurrence of finely divided powder was not observed.

B: Occurrence of finely divided powder was slightly observed.

C: Finely divided powder occurred to an extent such that the powder floats in the warm air dryer at a visibility of at least 5 m.

D: Finely divided powder occurred to an extent such that the powder floats in the warm air dryer at a visibility of shorter than 5 m.

[Shapability to Bales]

35 kg of block copolymer was molded by a mold for compression molding having a size of 76 cm×36 cm×20 cm at a compression pressure of 15 MPa, a compression time of 15 seconds and a compression temperature of 50° C. The appearance and state of the bale molding were observed and evaluated according to the following four ratings.

A: Molding is rigid and fragments are not produced when the molding surface is rubbed by fingers.

B: Molding is fairly rigid and fragments are produced when the molding surface is rubbed by fingers.

C: Molding (bale) is formed but when the bale is lifted up, cutouts are made or breaking occurs.

D: Molding cannot be formed.

[Color Tone (APHA) of Resin-Modifying Composition]

Colorimetry was conducted on a 5.43% solution in toluene of a resin-modifying composition according to ASTM D125 using a color tester ("OME-2000" available from Nippon Denshoku Industries Co., Ltd.).

[Gel Content in Resin-Modifying Composition]

5 g of resin-modifying composition (block copolymer containing a heat stabilizer) was placed in 95 g of xylene in an Erlenmeyer flask. The mixed liquid was stirred for 4 hours using a magnetic stirrer, and was filtered using a #2 filter paper to collect gel (xylene insoluble). The gel was dyed with a Sudan III solution in xylene, and number of gel particles was visually observed. The gel content was evaluated according to the following four ratings.

1. Gel particle having a diameter of at least 0.5 mm was not observed.

2. Several gel particles having a diameter of 0.5 to 1 mm were observed.

3. Gel particles having a diameter of about 1 mm were observed on the whole filter paper.

4. Gel particles having a diameter of about 2.5 mm as well as gel particles having a diameter of about 1 mm were observed.

[Storage Stability of Resin-Modifying Composition]

A sheet having a size of 15 cm×15 cm with thickness of 2 mm was made from a resin-modifying composition using a heat press machine. The sheet was left to stand at 70° C. for 1 week in a Geer oven while being ventilated twice per hour. The color tone of the sheet was visually observed, and further the gel content was measured by the same method as adopted for the above-mentioned determination of gel content in a resin-modifying composition. When coloration was not observed and sample was transparent, the result of visual observation was expressed as "good". When coloration was observed, the color was recorded.

[Luster of Resin-Modifying Composition]

A test sample of resin-modifying composition was prepared according to JIS K7105, and luster was measured by a luster-measuring apparatus.

[Total Luminous Transmittance of Resin-Modifying Composition]

Total luminous transmittance was measured according to ASTM D1003. The larger the total luminous transmittance, the better the transparency.

[Charpy Impact Value of Resin-Modifying Composition]

A test sample of resin-modifying composition was prepared according to JIS K7111 (notched) and Charpy impact value was measured.

Example 1

A 2,000 liter volume autoclave equipped with a condenser, a stirrer and a jacket was charged with 600 kg of a mixed solvent comprised of 30% of C4 fraction and 70% of cyclohexane, 16 kg of styrene and 64 kg of 1,3-butadiene, and further 0.057 mole of tetramethylethlene diamine was added. The temperature of the content was adjusted to 50° C. The C4 fraction was a fraction obtained by cracking of naphtha and comprising butane and butanes (main ingredient: cis-2-butene). The C4 fraction used in this example contained 1 ppm of acetylenes. A solution of 0.9 mole/liter of n-butyllithium in hexane was dropwise added to the content in the autoclave/while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 0.95 mole as the amount of lithium in the content to initiate the polymerization. When 10 minutes elapsed from the initiation of polymerization, 12 kg of styrene and 48 kg of 1,3-butadiene were added over a period of 40 minutes. When 30 minutes elapsed from the initiation of polymerization, the temperature reached 80° C. The content was maintained at 80° C. by controlling the condenser. When 30 minutes elapsed from the addition of monomers in the latter stage, the conversion substantially reached 100% which revealed the completion of polymerization for polymer block A.

Then 52 kg of styrene and 8 kg of 1,3-butadiene were added to the polymerization mixture over a period of 30 minutes. When 5 minutes elapsed from the commencement of monomer addition, 0.475 mole of tetramethylethylenediamine was further added to the polymerization mixture. When 40 minutes elapsed from the completion of monomer addition, the polymerization conversion reached substantially 100% which revealed the completion of polymerization for polymer block B. Then 2 moles of isopropyl alcohol was added to stop the polymerization. After termination of the polymerization, 0.1 part, based on 100 parts of the block copolymer, of 2,4-bis(n-octylthiomethyl)-6-methylphenol [heat stabilizer, "Irganox 1520" available from Ciba Speciality Chemicals Co.] was added and the mixture was rendered uniform. The uniform mixture was subjected to steam stripping to remove solvent to give a slurry of the block copolymer.

Thereafter the temperature of the slurry of block copolymer was adjusted to about 70° C., and the slurry was dehydrated by using an extrusion type squeezer (total length: 890 mm, diameter: 230 mm, length of portion having slit: 482 mm, slit width: 0.1 mm, revolution of drawing: 100 rpm, temperature: 40° C.) to give a crumb having a water content of about 10 to 15%. The crumb was dried by an expansion extrusion dryer (total length: 1200 mm, diameter: 250 mm) maintained at 135° C. The die head of the dryer was maintained at about 150° C. The extruded crumb was further dried by a warm air dryer (temperature: 70° C., flow rate of air: 100 liter/min, residence time: 10 min), connected downward from the expansion extrusion dryer, to give a block copolymer (Example 1) (resin-modifying composition).

The thus-obtained block copolymer of Example 1 was evaluated for the following properties. Glass transition temperature, bound styrene content (content of aromatic vinyl monomer units), bound butadiene content (content of conjugated diene monomer units), vinyl bond content (proportion of vinyl bond), viscosity of 5 wt. % styrene solution, weight average molecular weight (measurement by differential refractometer), molecular weight distribution (measurement by differential refractometer and ultraviolet visible spectrometer), styrene block ratio (aromatic vinyl block ratio), weight average molecular weight of styrene block (measurement by differential refractometer), molecular weight distribution of styrene block (measurement by differential refractometer) and gel content. The evaluation results are shown in Table 1-1.

Example 2

A block copolymer (resin-modifying composition) of Example 2 was made by the same procedures as described in Example 1 wherein the amount of tetramethylethylenediamine added in the process for producing the polymer block B was varied to 0.950 mole with all other conditions remaining the same.

The properties of the block copolymer of Example 2 were evaluated by the same methods as mentioned in Example 1. The evaluation results are shown in Table 1-1.

Example 3

A block copolymer (resin-modifying composition) of Example 3 was made by the same procedures as described in Example 1 wherein the amount of tetramethylethylenediamine added in the process for producing the polymer block B was varied to 0.950 mole, and the time of addition of monomers for producing the polymer block B were varied to 60 minutes. All other conditions remained the same.

The properties of the block copolymer of Example 3 were evaluated by the same methods as mentioned in Example 1. The evaluation results are shown in Table 1-1.

Example 4

A block copolymer (resin-modifying composition) of Example 4 was made by the same procedures as described in Example 1 wherein the addition of tetramethylethylenediamine in the process for producing the polymer block B was conducted immediately before the addition of the monomers for producing the polymer block B. All other conditions remained the same.

The properties of the block copolymer of Example 4 were evaluated by the same methods as mentioned in Example 1. The evaluation results are shown in Table 1-1.

Example 5

A block copolymer (resin-modifying composition) of Example 5 was made by the same procedures as described in Example 1 wherein tetramethylethylenediamine was not added in the process for producing the polymer block B, and the polymerization reaction was continued for 70 minutes after the completion of addition of the monomers for producing the polymer block B to thereby increase the polymerization conversion to substantially 100%. All other conditions remained the same.

The properties of the block copolymer of Example 5 were evaluated by the same methods as mentioned in Example 1. The evaluation results are shown in Table 1-1.

Example 6

A 2,000 liter volume autoclave equipped with a condenser, a stirrer and a jacket was charged with 600 kg of a mixed solvent comprised of 30% of C4 fraction and 70% of cyclohexane, 8 kg of styrene and 52 kg of 1,3-butadiene, and further 0.073 mole of tetramethylethlene diamine was added. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 1.22 moles as the amount of lithium in the content to initiate the polymerization. When 20 minutes elapsed from the initiation of polymerization, 80 kg of 1,3-butadiene were added over a period of 60 minutes. When 30 minutes elapsed from the initiation of polymerization, the temperature reached 80° C. The content was maintained at 80° C. by controlling the condenser. When 30 minutes elapsed from the addition of monomers in the latter stage, the conversion substantially reached 100% which revealed the completion of polymerization for polymer block A.

Then 52 kg of styrene and 8 kg of 1,3-butadiene were added to the polymerization mixture over a period of 30 minutes. When 5 minutes elapsed from the commencement of monomer addition, 0.61 mole of tetramethylethylenediamine was further added to the polymerization mixture. When 40 minutes elapsed from the completion of monomer addition, the polymerization conversion reached substantially 100% which revealed the completion of polymerization for polymer block B. Then 2 moles of isopropyl alcohol was added to stop the polymerization.

Thereafter the same procedures as described in Example 1 were repeated to give a block copolymer (resin-modifying composition) of Example 6.

The properties of the block copolymer of Example 6 were evaluated by the same methods as mentioned in Example 1. The evaluation results are shown in Table 1-1.

Example 7

A 2,000 liter volume autoclave equipped with a condenser, a stirrer and a jacket was charged with 600 kg of a mixed solvent comprised of 30% of C4 fraction and 70% of cyclohexane, 10 kg of styrene and 57 kg of 1,3-butadiene, and further 0.087 mole of tetramethylethlene diamine was added. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 1.45 moles as the amount of lithium in the content to initiate the polymerization. When 20 minutes elapsed from the initiation of polymerization, 100 kg of 1,3-butadiene were added over a period of 60 minutes. When 30 minutes elapsed from the initiation of polymerization, the temperature reached 80° C. The content was maintained at 80° C. by controlling the condenser. When 30 minutes elapsed from the addition of monomers in the latter stage, the conversion substantially reached 100% which revealed the completion of polymerization for polymer block A.

Then 30 kg of styrene and 5 kg of 1,3-butadiene were added to the polymerization mixture over a period of 30 minutes. When 5 minutes elapsed from the commencement of monomer addition, 0.725 mole of tetramethylethylenediamine was further added to the polymerization mixture. When 40 minutes elapsed from the completion of monomer addition, the polymerization conversion reached substantially 100% which revealed the polymerization of polymer block B. Then 2 moles of isopropyl alcohol was added to stop the polymerization.

Thereafter the same procedures as described in Example 1 were repeated to give a block copolymer (resin-modifying composition) of Example 7.

The properties of the block copolymer of Example 7 were evaluated by the same methods as mentioned in Example 1. The evaluation results are shown in Table 1-1.

Example 8

A polymer block A was prepared by the same procedures as described in Example 1. Then 20 kg of styrene was added to the polymerization mixture over a period of 10 minutes. When 5 minutes elapsed from the commencement of styrene addition, 0.475 mole of tetramethylethylenediamine was further added to the polymerization mixture. When 30 minutes elapsed from the completion of styrene addition, the polymerization conversion reached substantially 100% which revealed the completion of polymerization of styrene.

Then 32 kg of styrene and 8 kg of 1,3-butadiene were added to the polymerization mixture over a period of 20 minutes. When 40 minutes elapsed from the completion of monomer addition, the polymerization conversion reached substantially 100% which revealed the completion of polymerization for polymer block B. Then 2 moles of isopropyl alcohol was added to stop the polymerization.

Thereafter the same procedures as described in Example 1 were repeated to give a block copolymer (resin-modifying composition) of Example 8.

The properties of the block copolymer of Example 8 were evaluated by the same methods as mentioned in Example 1. The evaluation results are shown in Table 1-1.

Comparative Example 1

A 2,000 liter volume autoclave equipped with a condenser, a stirrer and a jacket was charged with 600 kg of a mixed solvent comprised of 30% of C4 fraction and 70% of cyclohexane, and 60 kg of 1,3-butadiene. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 1.11 moles as expressed as the amount of lithium in the content to initiate the polymerization. When 30 minutes elapsed from the initiation of polymerization, 60 kg of 1,3-butadiene were added over a period of 30 minutes. When 30 minutes elapsed from the initiation of polymerization, the temperature reached 80° C. The content was maintained at 80° C. by controlling the condenser. When 30 minutes elapsed from the addition of monomers in the latter stage, the conversion substantially reached 100% which revealed the completion of polymerization for polymer block A (polybutadiene block).

Then 80 kg of styrene was added to the polymerization mixture over a period of 80 minutes. When 70 minutes elapsed from the completion of monomer addition, the polymerization conversion reached substantially 100% which revealed the completion of polymerization for polymer block B (polystyrene block). Then 2 moles of isopropyl alcohol was added to stop the polymerization.

Thereafter the same procedures as described in Example 1 were repeated to give a block copolymer (resin-modifying composition) of Comparative Example 1.

The properties of the block copolymer of Example 7 were evaluated by the same methods as mentioned in Example 1. The evaluation results are shown in Table 1-2.

Comparative Example 2

A polymer block A was prepared by the same procedures as described in Example 1 wherein the amount of 1,3-butadiene added at the later stage in the production process of polymer block A was varied to 56 kg with all other conditions remaining the same. Then 52 kg of styrene was added to the polymerization mixture over a period of 120 minutes. When 60 minutes elapsed from the completion of styrene addition, the polymerization conversion reached substantially 100% which revealed the completion of polymerization of styrene. Then, 2 moles of isopropyl alcohol was added to stop the polymerization.

The same procedures as described in Example 1 were repeated to give a block copolymer of Comparative Example 2.

The properties of the block copolymer of Comparative Example 2 were evaluated by the same methods as mentioned in Example 1. The evaluation results are shown in Table 1-2.

Comparative Example 3

A polymer block A was prepared by the same procedures as described in Example 1 wherein the amount of 1,3-butadiene added at the late stage in the production process of polymer block A was varied to 54 kg with all other conditions remaining the same. Then 26 kg of styrene was added to the polymerization mixture over a period of 30 minutes. When 30 minutes elapsed from the completion of styrene addition, it was confirmed that the polymerization conversion reached substantially 100%.

Then 2 kg of 1,3-butadiene was added to the polymerization mixture over a period of 5 minutes. Further 30 minutes later, 26 kg of styrene was added over a period of 30 minutes. When 60 minutes elapsed from the completion of monomer addition, it was confirmed that the polymerization conversion reached substantially 100%. Then, 2 moles of isopropyl alcohol was added to stop the polymerization.

The same procedures as described in Example 1 were repeated to give a block copolymer of Comparative Example 3.

The properties of the block copolymer of Comparative Example 3 were evaluated by the same methods as mentioned in Example 1. The evaluation results are shown in Table 1-2.

Comparative Example 4

A polymer block A was prepared by the same procedures as described in Example 1 wherein the amount of 1,3-butadiene added at the later stage in the production process of polymer block A was varied to 52 kg with all other conditions remaining the same. Then 20 kg of styrene was added to the polymerization mixture over a period of 30 minutes. When 30 minutes elapsed from the completion of styrene addition, it was confirmed that the polymerization conversion reached substantially 100%.

Then 2 kg of 1,3-butadiene was added to the polymerization mixture over a period of 5 minutes. Further, 20 minutes later, 18 kg of styrene was added over a period of 10 minutes. When 30 minutes elapsed from the completion of monomer addition, it was confirmed that the polymerization conversion reached substantially 100%.

Further, 2 kg of 1,3-butadiene was added over a period of 5 minutes, and, 30 minutes later, 14 kg of styrene was added over a period of 30 minutes. When 60 minutes elapsed from the completion of monomer addition, it was confirmed that the polymerization conversion reached substantially 100%. Then 2 moles of isopropyl alcohol was added to stop the polymerization.

The same procedures as described in Example 1 were repeated to give a block copolymer of Comparative Example 4.

The properties of the block copolymer of Comparative Example 4 were evaluated by the same methods as mentioned in Example 1. The evaluation results are shown in Table 1-2.

Comparative Example 5

A 2,000 liter volume autoclave equipped with a condenser, a stirrer and a jacket was charged with 600 kg of a mixed solvent comprised of 30% of C4 fraction and 70% of cyclohexane, 60 kg of styrene and 40 kg of 1,3-butadiene, and further 0.19 mole of tetramethylethlene diamine was added. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 0.95 mole as expressed as the amount of lithium in the content to initiate the polymerization. When 10 minutes elapsed from the initiation of polymerization, 80 kg of 1,3-butadiene were added over a period of 120 minutes. When 30 minutes elapsed from the initiation of polymerization, the temperature reached 80° C. The content was maintained at 80° C. by controlling the condenser. When 30 minutes elapsed from the addition of 1,3-butadiene in the latter stager the conversion substantially reached 100% which revealed the completion of polymerization for polymer block.

Then 20 kg of styrene was added to the polymerization mixture over a period of 20 minutes. When 40 minutes elapsed from the completion of styrene addition, the polymerization conversion reached substantially 100% which revealed the completion of polymerization for polymer block. Then 2 moles of isopropyl alcohol was added to stop the polymerization.

The same procedures as described in Example 1 were repeated to give a block copolymer of Comparative Example 5.

The properties of the block copolymer of Comparative Example 5 were evaluated by the same methods as mentioned in Example 1. The evaluation results are shown in Table 1-2.

Comparative Example 6

A 2,000 liter volume autoclave equipped with a condenser, a stirrer and a jacket was charged with 600 kg of a mixed solvent comprised of 30% of C4 fraction and 70% of cyclohexane, 40 kg of styrene and 50 kg of 1,3-butadiene, and further 0.40 mole of tetramethylethlene diamine was added. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 0.95 mole as expressed as the amount of lithium in the content to initiate the polymerization. When 20 minutes elapsed from the initiation of polymerization, 62 kg of 1,3-butadiene were added over a period of 60 minutes. When 30 minutes elapsed from the initiation of polymerization, the temperature reached 80° C. The content was maintained at 80° C. by controlling the condenser. When 30 minutes elapsed from the addition of 1,3-butadiene in the latter stage, the conversion substantially reached 100% which revealed the completion of polymerization for polymer block.

Then 40 kg of styrene and 8 kg of 1,3-butadiene were added to the polymerization mixture over a period of 30 minutes. When minutes elapsed from the commencement of the monomer addition, 0.475 mole of tetramethylethylenediamine was further added. When 40 minutes elapsed from the completion of monomer addition, the polymerization conversion reached substantially 100% which revealed the completion of polymerization for polymer block. Then 2 moles of isopropyl alcohol was added to stop the polymerization.

The same procedures as described in Example 1 were repeated to give a block copolymer of Comparative Example 6.

The properties of the block copolymer of Comparative Example 6 were evaluated by the same methods as mentioned in Example 1. The evaluation results are shown in Table 1-2.

Comparative Example 7

A 2,000 liter volume autoclave equipped with a condenser, a stirrer and a jacket was charged with 600 kg of a mixed solvent comprised of 30% of C4 fraction and 70% of cyclohexane, 40 kg of styrene and 50 kg of 1,3-butadiene, and further 0.069 mole of tetramethylethlenediamine was added. The temperature of the content was adjusted to 50° C. A solution of 0.9 mole/liter of n-butyllithium in hexane was dropwise added to the content in the autoclave, while the pressure increase and the pressure drop were observed, until immediately before the proceeding of polymerization reaction to titrate the ingredients of deactivating the polymerization reaction. Then a previously prepared n-butyllithium solution of the same concentration as mentioned above was added to the content in the autoclave in an amount of 0.77 mole as expressed as the amount of lithium in the content to initiate the polymerization. When 30 minutes elapsed from the initiation of polymerization, 33 kg of 1,3-butadiene were added over a period of 30 minutes. When 30 minutes elapsed from the initiation of polymerization, the temperature reached 80° C. The content was maintained at 80° C. by controlling the condenser. When 30 minutes elapsed from the addition of 1,3-butadiene in the latter stage, the conversion substantially reached 100% which revealed the completion of polymerization for polymer block.

Then 70 kg of styrene and 11 kg of 1,3-butadiene were added to the polymerization mixture over a period of 40 minutes. When 2 minutes elapsed from the commencement of the monomer addition, 0.385 mole of tetramethylethylenediamine was further added. When 80 minutes elapsed from the completion of monomer addition, the polymerization conversion reached substantially 100% which revealed the completion of polymerization for polymer block. Then 2 moles of isopropyl alcohol was added to stop the polymerization.

The same procedures as described in Example 1 were repeated to give a block copolymer of Comparative Example 7.

The properties of the block copolymer of Comparative Example 7 were evaluated by the same methods as mentioned in Example 1. The evaluation results are shown in Table 1-2.

[Production of Modified Resin Composition Using Block Copolymers of Examples 1-8 and Comparative Examples 1-7]

10 parts of each of the block copolymers (containing a heat stabilizer) of Examples 1-8 and Comparative Examples 1-7 was dissolved in 90 parts of styrene, and 300 ppm of n-dodecyl mercaptan (chain transfer agent) was added to the solution to prepare a liquid for polymerization. A 4 liter reaction vessel provided with a jacket was charged with 2,300 parts of the liquid for polymerization. Polymerization was carried out at 130° C. while being thoroughly stirred until the solid concentration became 45%. The polymerization liquid was taken from the reaction vessel and cooled at 20° C. A 4 liter stainless steel reaction vessel equipped with a stirrer was charged with 625 parts of the polymerization liquid and 1,875 parts of an aqueous 0.5% solution of polyvinyl alcohol ("Gosenol GH-20" available from Nippon Synthetic Chemical Industries Co.), and the content was heated to 70° C. with stirring. Then 1.25 parts of benzoyl peroxide and 0.63 part of dicumyl peroxide as radical polymerization initiator were added to the content. A suspension polymerization was carried out while the temperature was elevated step by step, i.e., while the content was maintained at 70° C. for 1 hour, 90° C. for 1 hour, 110° C. for 1 hour and 130° C. for 4 hours. After the completion of polymerization, the polymerization liquid was cooled to 20° C., and filtered to collect a polymer. The polymer was washed with water and then dehydrated and further dried under vacuum at 60° C. for 12 hours. Thus modified resin compositions (modified polystyrene compositions) of Examples 1-8 and Comparative Examples 1-7 were obtained.

Luster and Charpy impact value of the modified resin compositions were evaluated. The evaluation results are shown in Tables 1-1 and 1-2.

Footnote in Tables 1-1 and 1-2

"A", "B", "PS", "PB", "X", "-" and "/" occurring in line of "Structure" have the following meanings.

"A" refers polymer block A having a glass transition temperature falling in the temperature range claimed in the present application and comprised of styrene units and butadiene units.

"B" refers polymer block B having a glass transition temperature falling in the temperature range claimed in the present application and comprised of styrene units and butadiene units.

"PS" refers polymer block comprised only of styrene units.

"PB" refers polymer block comprised only of butadiene units.

"X" refers polymer block having a glass transition temperature which does not fall in the temperature range claimed for polymer block A in the present application nor falls in the temperature range for polymer block B in the present application, and comprised of styrene units and butadiene units.

"-" refers to that the adjacent polymer blocks are directly bonded to each other.

"/" refers to that the adjacent polymer blocks are bonded via a low-molecular-weight polybutadiene polymer block.

*1 Measurement is made by differential refractometer.
*2 Measurement is made by ultraviolet photospectrometer.

TABLE 1-1

|  | Examples | | | | | | | |
|---|---|---|---|---|---|---|---|---|
|  | 1 | 2 | 3 | 4 | 5 | 6 | 7 | 8 |
| Block copolymer | | | | | | | | |
| Structure | A-B | A-B | A-B | A-B | A-B | A-B | A-B | A-PS-B |
| Polymer block A/polymer block B (wt. ratio) | 2.33 | 2.33 | 2.33 | 2.33 | 2.33 | 2.33 | 4.77 | 3.50 |
| Glass transition temperature (° C.) | | | | | | | | |
| Polymer block A (low Tg block) | −86 | −86 | −87 | −85 | −85 | −88 | −88 | −86 |
| Polymer block B (high Tg block) | 56 | 57 | 55 | 56 | 57 | 56 | 53 | 63 |
| Content of monomer units (wt. %) | | | | | | | | |
| Content of bound styrene | 40.3 | 40.2 | 40.5 | 40.3 | 40.3 | 29.9 | 20.2 | 40.1 |
| Content of bound 1,3-butadiene | 59.7 | 59.8 | 59.5 | 59.7 | 59.7 | 70.1 | 79.8 | 59.9 |
| Content of vinyl bond in butadiene portion (%) | 11.5 | 11.1 | 11.0 | 11.2 | 11.2 | 11.3 | 10.8 | 11.2 |
| Styrene block ratio (wt. %) | 31.2 | 32.3 | 28.5 | 35.8 | 35.8 | 31.6 | 29.5 | 37.2 |
| Mw of styrene block ($\times 10^{-4}$) | 1.01 | 0.96 | 0.83 | 1.22 | 1.48 | 0.76 | 0.67 | 1.65 |
| Mw/Mn of styrene block | 2.16 | 2.35 | 2.46 | 1.95 | 1.99 | 2.33 | 2.16 | 2.41 |
| Mw ($\times 10^{-3}$) | 348 | 347 | 345 | 344 | 345 | 289 | 261 | 343 |
| Mw/Mn *1 | 1.09 | 1.13 | 1.19 | 1.39 | 1.15 | 1.27 | 1.24 | 1.29 |
| Mw/Mn *2 | 1.12 | 1.15 | 1.28 | 1.50 | 1.19 | 1.31 | 1.26 | 1.41 |
| Viscosity of 5 wt. % solution in styrene (mPa · s) | 39.2 | 39.1 | 36.8 | 38.1 | 38.4 | 38.2 | 37.5 | 39.1 |

TABLE 1-1-continued

|  | Examples | | | | | | | |
| --- | --- | --- | --- | --- | --- | --- | --- | --- |
|  | 1 | 2 | 3 | 4 | 5 | 6 | 7 | 8 |
| Occurrence of finely divided powder | A | A | A | A | A | A | B | A |
| Shapability to bales | A | A | A | A | A | A | A | A |
| Gel content | 1 | 1 | 1 | 1 | 1 | 1 | 1 | 1 |
| Modified resin composition | | | | | | | | |
| Luster (%) | 97 | 96 | 95 | 94 | 96 | 93 | 92 | 97 |
| Charpy impact resistance (KJ/m$^2$) | 8.1 | 7.9 | 7.7 | 7.6 | 7.5 | 6.5 | 6.1 | 7.1 |

TABLE 1-2

|  | Comparative Examples | | | | | | |
| --- | --- | --- | --- | --- | --- | --- | --- |
|  | 1 | 2 | 3 | 4 | 5 | 6 | 7 |
| Block copolymer | | | | | | | |
| Structure | PB-PS | A-PS | A-PS/PS | A-PS/PS/PS | X-PS | X-B | X-A |
| Polymer block A/polymer block B (wt. ratio) | — | — | — | — | — | — | 1.52 |
| Glass transition temperature (° C.) | | | | | | | |
| Polymer block A (low Tg block) | (−94) | −84 | −87 | −86 | −48 | (−38) | −75 |
| Polymer block B (high Tg block) | (102) | (102) | (98) | (96) | (98) | 49 | 56 |
| Content of monomer units (wt. %) | | | | | | | |
| Content of bound styrene | 39.2 | 39.9 | 39.6 | 39.2 | 40.1 | 40.1 | 54.8 |
| Content of bound 1,3-butadiene | 60.8 | 60.1 | 60.4 | 60.8 | 59.9 | 59.9 | 45.2 |
| Content of vinyl bond in butadiene portion (%) | 8.7 | 11.5 | 11.5 | 11.5 | 11.2 | 22.8 | 11.5 |
| Styrene block ratio (wt. %) | 99.8 | 67.5 | 66.2 | 65.3 | 27.6 | 36.7 | 45.5 |
| Mw of styrene block (×10$^{-4}$) | 7.66 | 7.83 | 2.85 | 2.02 | 1.33 | 1.23 | 1.69 |
| Mw/Mn of styrene block | 1.16 | 1.54 | 1.54 | 1.70 | 2.23 | 2.38 | 1.48 |
| Mw (×10$^{-3}$) | 286 | 334 | 341 | 339 | 334 | 345 | 382 |
| Mw/Mn *1 | 1.25 | 1.07 | 1.53 | 1.47 | 1.43 | 1.31 | 1.41 |
| Mw/Mn *2 | 1.75 | 1.12 | 1.75 | 1.53 | 1.51 | 1.46 | 1.48 |
| Viscosity of 5 wt. % solution in styrene (mPa · s) | 37.6 | 40.1 | 38.3 | 37.9 | 39.7 | 39.2 | 36.8 |
| Occurrence of finely divided powder | D | D | D | C | B | A | B |
| Shapability to bales | D | D | C | B | B | A | C |
| Gel content | 4 | 4 | 3 | 2 | 1 | 1 | 2 |
| Modified resin composition | | | | | | | |
| Luster (%) | 93 | 96 | 96 | 95 | 43 | 96 | 96 |
| Charpy impact resistance (KJ/m$^2$) | 4.3 | 5.1 | 5.8 | 6.3 | 5.4 | 3.7 | 3.9 |

As seen from Table 1-1, the block copolymer according to the present invention (Examples 1-8) does not easily become powdery and has good shapability to bales, and is not easily gelled. A modified resin composition made from the block copolymer has excellent impact resistance and luster.

A block copolymer (Table 1-2, Comparative Examples 1-4) having polystyrene block instead of polymer block B easily becomes powdery and has poor shapability to bales and is easily gelled. Modified resin composition (Comparative Examples 5, 6) made from a block copolymer having a polymer block having a glass transition temperature higher than −45° C. instead of polymer block A has poor impact resistance. A block copolymer (Comparative Example 7) having polymer block A and polymer block B, but having too large content of aromatic vinyl monomer units exhibits poor shapability to bales and a modified resin composition made from the block copolymer has poor impact resistance.

Examples 9-15, Comparative Examples 8, 9

Production of Resin-Modifying Composition Comprising Block Copolymer and Heat Stabilizer Resin-modifying compositions of Examples 9-11 and 13-15 were produced by the same procedures as described in Example 1 except that the heat stabilizer ("Irganox 1520" available from Ciba Speciality Chemical Co.) added after termination of polymerization was varied to those recited in Table 2. All other conditions remained the same.

Similarly, a resin-modifying composition of Example 12 was produced by the same procedures as described in Example 8 except that the heat stabilizer ("Irganox 1520") was varied to that recited in Table 2. All other conditions remained the same.

Similarly, resin-modifying compositions of Comparative Examples 8 and 9 were produced by the same procedures as described in Comparative Example 4 except that the heat stabilizer ("Irganox 1520") was varied to that recited in Table 2. All other conditions remained the same.

TABLE 2

|  | Examples |  |  |  |  |  |  | Comp. Ex. |  |
|---|---|---|---|---|---|---|---|---|---|
|  | 9 | 10 | 11 | 12 | 13 | 14 | 15 | 8 | 9 |
| Production of block copolymer | Ex. 1 | Ex. 1 | Ex. 1 | Ex. 8 | Ex. 1 | Ex. 1 | Ex. 1 | Co. Ex. 4 | Co. Ex. 4 |
| Kind and amount of heat stabilizer *1 |  |  |  |  |  |  |  |  |  |
| Heat stabilizer 1 | 0.04 | — | 0.04 | 0.04 | — | 0.08 | 0.08 | 0.08 | — |
| Heat stabilizer 2 | 0.04 | 0.08 | — | — | 0.10 | — | — | — | 0.10 |
| Heat stabilizer 3 | — | — | 0.04 | 0.04 | — | — | — | — | — |
| Heat stabilizer 4 | — | — | — | — | — | — | 0.15 | 0.15 | — |
| Heat stabilizer 5 | 0.08 | 0.15 | 0.08 | 0.08 | — | 0.15 | — | — | — |
| Resin-modifying composition |  |  |  |  |  |  |  |  |  |
| Gel content | 1 | 1 | 1 | 1 | 1 | 1 | 1 | 3 | 2 |
| Color tone | 3 | 5 | 1 | 1 | 10 | 4 | 7 | 12 | 17 |
| Gel content after standing in Geer oven | 1 | 1 | 1 | 1 | 1 | 1 | 2 | 4 | 4 |
| Color tone after standing in Geer oven *2 | Good | Good | Good | Good | Good | Good | Yellow | Orange | Yellow |

*1 Amount (wt. parts) of heat stabilizer added to 100 wt. parts of block copolymer
*2 Color tone observed by visual examination
Heat stabilizer 1: Irganox 1076 available from Ciba Speciality Chem. Co., Octadecyl-3-(3,5-di-t-butyl-4-hydroxyphenyl) propionate
Heat stabilizer 2: Irganox 1520 available from Ciba Speciality Chem. Co., 4,6-Bis(octylthiomethyl)-o-cresol
Heat stabilizer 3: Sumilizer GS available from Sumitomo Chem. Co., 2-[1-(2-hydroxy-3,5-di-t-pentylphenyl)ethyl]-4,6-di-t-pentylphenyl acrylate
Heat stabilizer 4: TNP available from Adeka Corp.; Trisnonylphenyl phosphite
Heat stabilizer 5: Doverphos 479 available from Dover Co., Tetratridecyl-4,4-butylidenebis(2-t-butyl-5-methylphenyl) diphosphite As seen from Table 2, the resin-modifying composition (Examples 9-15) of the present invention has excellent storage stability. The resin-modifying composition (Examples 9-12, 14) containing a phosphite compound heat stabilizer (heat stabilizer 5) having at least two phosphorus atoms in the molecule does not exhibit discoloration even when the composition is allowed to stand in a Geer oven, and exhibits excellent storage stability.

The resin-modifying composition (Comparative Examples 8, 9) made from a block copolymer comprising a polystyrene block instead of polymer block B has poor storage stability.

Examples 16-19, Comparative Examples 10, 11

Production of Modified Resin Composition Using Acrylic Resin as Substrate Resin

A 20 liter volume completely mixing type reaction vessel equipped with a stirrer was charged with 7.9 parts of the block copolymer of Example 4, or a resin-modifying composition of Example 9, 11 or 12 or Comparative Example 4 or 5, and further with 46.6 parts of styrene, 32.5 parts of methyl methacrylate, 4.6 parts of butyl acrylate and 8.4 parts of ethylbenzene to prepare 100 parts of a mixed liquid. The amounts of styrene and methyl methacrylate were set so that the resulting substrate resin (acrylic resin) had an approximately the same refractive index as that of the block copolymer used. To the mixed liquid, 0.02 part of 1,1-bis(tert-butylperoxy)-3,3,5-trimethylcyclohexane and 0.07 part of n-dodecylmercaptan were added, and the mixed liquid was heated to 135° C. while being stirred at a revolution rate of stirrer of 150 rpm to initiate the polymerization. When the mixed liquid was maintained at 135° C. for 120 minutes, it was proved that the polymerization conversion reached about 40%. Then the temperature of the mixed liquid was elevated to 150° C. and maintained at that temperature for 120 minutes. The polymerization conversion was proved to be about 80%. The thus-obtained polymerization liquid was extruded through an bent-type extruder where processed at 230° C. under vacuum to remove volatile ingredients. The thus-obtained bulk resin-modifying composition was pulverized to give pellets of a modified resin composition (Examples 16-19 and Comparative Examples 10, 11).

The luster, total luminous transmittance and Charpy impact value of the thus-produced pellet-form modified resin compositions of Examples 16-19 and Comparative Examples 10 and 11 were evaluated. The evaluation results are shown in Table 3.

TABLE 3

|  | Example |  |  |  | Comp. Example |  |
|---|---|---|---|---|---|---|
|  | 16 | 17 | 18 | 19 | 10 | 11 |
| Resin-modifying composition | Ex. 9 | Ex. 11 | Ex. 12 | Ex. 4 | Co. Ex. 4 | Co. Ex. 5 |
| Modified resin composition |  |  |  |  |  |  |
| Luster (%) | 100 | 101 | 98 | 100 | 78 | 55 |
| Total luminous transmittance (%) | 92.1 | 91.8 | 91.3 | 90.3 | 85.6 | 82.3 |
| Charpy impact value (KJ/m$^2$) | 9.3 | 9.1 | 8.8 | 8.5 | 4.9 | 5.8 |

As seen from Table 3, the modified resin composition of the present invention (Examples 16-19) comprising an acrylic resin as a substrate resin has excellent luster, transparency and impact resistance. In contrast, the modified resin composition (Comparative Examples 10, 11) made from a block copolymer comprising a polystyrene block instead of polymer block B has poor luster, transparency and impact resistance.

INDUSTRIAL APPLICABILITY

The block copolymer according to the present invention does not easily become powdery in the production process and has good shapability to bales and other articles, and thus, can be produced with enhanced productivity, and, when using as a resin modifier, it can give a modified resin composition having good impact resistance, transparency and luster.

In view of the above-mentioned beneficial properties, a modified resin composition comprising the block copolymer of the present invention and a substrate resin can be widely used, and especially suitable for uses for which excellent impact resistance and transparency are required. For example, the modified resin composition can be used for optical disks, optical lens, prism, light diffusers, optical cards, optical fibers, optical mirrors, liquid crystal display element boards, light guides, polarizing films, phase films, personal computer peripheral devices, OA instruments, food containers, medical instrument parts, food packaging vessels, furniture, stationery and sundry goods. Especially it is suitable for food packaging vessels and packaging films.

The invention claimed is:

1. A block copolymer comprising polymer block A comprising conjugated diene monomer units and aromatic vinyl monomer units, and polymer block B comprising conjugated diene monomer units and aromatic vinyl monomer units, wherein said block copolymer is a straight chain block copolymer represented by the following general formula (1) or (2):

A-B            general formula (1)

wherein A represents polymer block A, and B represents polymer block B,

$A\text{-}(X_i)_n\text{—}B$            general formula (2)

wherein A represents polymer block A, B represents polymer block B, $X_i$ represents a polymer block comprised only of conjugated diene monomer units or aromatic vinyl monomer units, and n is an integer in the range of 1 to 10;

the ratio of the conjugated diene monomer units to aromatic vinyl monomer units in the polymer block A is in the range of 95/5 to 30/70 by weight, and the ratio of the conjugated diene monomer units to the aromatic vinyl monomer units in the polymer block B is in the range of 5/95 to 30/70 by weight, and said block copolymer satisfies the following requirements:
(1) the polymer block A has a glass transition temperature in the range of −88° C. to −45° C. as measured by differential scanning calorimetry,
(2) the polymer block B has a glass transition temperature in the range of 30° C. to 90° C. as measured by differential scanning calorimetry,
(3) the content of aromatic vinyl monomer units in the whole block copolymer is in the range of 3% to 52% by weight based on the weight of the block copolymer,
(4) the aromatic vinyl block ratio in the whole block copolymer is smaller than 69% by weight,
(5) the viscosity of a solution of the block copolymer in styrene with a concentration of 5% by weight as measured at 25° C. is in the range of 30 to 80 mPa·s, and
(6) the ratio of the polymer block A to the polymer block B is in the range of 0.43 to 4.0 by weight.

2. The block copolymer according to claim 1, wherein the content of conjugated diene monomer units in the whole block copolymer is in the range of 48% to 97% by weight based on the weight of the block copolymer.

3. The block copolymer according to claim 1, wherein the conjugated diene monomer units in the whole block copolymer have a vinyl bond content of not larger than 30% based on the weight of the whole conjugated diene monomer units.

4. The block copolymer according to claim 1, which has a weight average molecular weight (Mw) in the range of 210,000 to 500,000 as expressed in terms of that of polystyrene as measured by gel permeation chromatography using a differential refractometer.

5. The block copolymer according to claim 1, which has a molecular weight distribution as defined by a ratio (Mw/Mn) of weight average molecular weight (Mw) to number average molecular weight (Mn) in the range of 1.0 to 1.5, wherein Mw and Mn are expressed in terms of those of polystyrene as measured by gel permeation chromatography using an ultraviolet spectrophotometer at a detection wavelength of 254 nm.

6. The block copolymer according to claim 1, wherein the block aromatic vinyl portion in the block copolymer has a weight average molecular weight in the range of 1,000 to 70,000 as expressed in terms of that of polystyrene as measured by gel permeation chromatography using a differential refractometer.

7. The block copolymer according to claim 1, wherein the block aromatic vinyl portion in the block copolymer has a molecular weight distribution as defined by a ratio (Mw/Mn) of weight average molecular weight (Mw) to number average molecular weight (Mn) in the range of 1.5 to 3.0, wherein Mw and Mn are expressed in terms of those of polystyrene as measured by gel permeation chromatography using a differential refractometer.

8. The block copolymer according to claim 3, wherein the ratio of the polymer block A to the polymer block B is in the range of 1.0 to 4.0 by weight.

9. The block copolymer according to claim 1, which has a Mooney viscosity ($ML_{1+4}$, 100° C.) in the range of 50 to 140.

10. A process for producing the block copolymer as claimed in claim 1, which comprises the steps of:
polymerizing monomers for forming one of the polymer block A and the polymer block B in the presence of a polymerization initiator, and then
adding monomers for forming the other of the polymer block A and the polymer block B to a polymerization system, followed by polymerization thereof.

11. The process for producing the block copolymer according to claim 10, wherein the polymerization initiator is selected from the group consisting of an organic alkali metal compound, an organic alkaline earth metal compound and an organic lanthanoid rare earth metal compound.

12. The process for producing the block copolymer according to claim 10, wherein the polymerization is carried out in the presence of a Lewis base compound selected from the group consisting of ethers, tertiary amines, alkali metal alkoxides and phosphines.

13. The process for producing the block copolymer according to claim 10, which comprises the steps of:
polymerizing monomers for forming the polymer block or blocks A in the presence of a Lewis base compound, and then
adding an additional Lewis base compound and monomers for forming the polymer block or blocks B to the polymerization system, followed by polymerization thereof.

14. The process for producing the block copolymer according to claim 13, wherein, after commencement of addition of the monomers for forming the polymer block B, addition of the additional Lewis base compound is commenced.

15. A resin-modifying composition, which comprises the block copolymer as claimed in claim 1.

16. The resin-modifying composition according to claim 15, which further comprises a heat stabilizer comprised of a phosphite compound containing at least two phosphorus atoms in the molecule.

17. A resin-modified composition comprising a resin-modifying composition and a substrate resin,
wherein the resin-modifying composition comprises a block copolymer comprising polymer block A comprising conjugated diene monomer units and aromatic vinyl monomer units, and polymer block B comprising conjugated diene monomer units and aromatic vinyl monomer units, wherein said block copolymer is a straight chain block copolymer represented by the following general formula (1) or (2):

A-B                            general formula (1)

wherein A represents polymer block A, and B represents polymer block B,

A-(X$_i$)$_n$—B                      general formula (2)

wherein A represents polymer block A, B represents polymer block B, X$_i$ represents a polymer block comprised only of conjugated diene monomer units or aromatic vinyl monomer units, and n is an integer in the range of 1 to 10;
the ratio of the conjugated diene monomer units to aromatic vinyl monomer units in the polymer block A is in the range of 95/5 to 30/70 by weight, and the ratio of the conjugated diene monomer units to the aromatic vinyl monomer units in the polymer block B is in the range of 5/95 to 30/70 by weight, and
said block copolymer satisfies the following requirements:
(1) the polymer block A has a glass transition temperature in the range of −88° C. to −45° C. as measured by differential scanning calorimetry,
(2) the polymer block B has a glass transition temperature in the range of 30° C. to 90° C. as measured by differential scanning calorimetry,
(3) the content of aromatic vinyl monomer units in the whole block copolymer is in the range of 3% to 52% by weight based on the weight of the block copolymer,
(4) the aromatic vinyl block ratio in the whole block copolymer is smaller than 69% by weight, and
(5) the viscosity of a solution of the block copolymer in styrene with a concentration of 5% by weight as measured at 25° C. is in the range of 30 to 80 mPa·s.

18. The resin-modified composition according to claim 17, wherein the substrate resin comprises aromatic vinyl monomer units.

19. The resin-modified composition according to claim 17, wherein the ratio of the resin-modifying composition to the substrate resin is in the range of 2/98 to 25/75 by weight as expressed in terms of the ratio of the weight of the block copolymer in the resin-modifying composition to the weight of the substrate resin.

20. A process for producing the resin-modified composition as claimed in claim 17, which comprises polymerizing a monomer for forming the substrate resin in the presence of the resin-modifying composition comprising the block copolymer.

21. The block copolymer according to claim 1, wherein said block copolymer is a straight chain block copolymer represented by general formula (1).

22. The block copolymer according to claim 3, wherein the conjugated diene monomer units in the whole block copolymer have a vinyl bond content of not larger than 15% based on the whole conjugated diene monomer units.

23. The block copolymer according to claim 3, wherein the ratio of the conjugated diene monomer units to aromatic vinyl monomer units in the polymer block A is in the range of 90/10 to 60/40 by weight.

24. The resin-modified composition according to claim 17, wherein the content of conjugated diene monomer units in the whole block copolymer is in the range of 48% to 97% by weight based on the weight of the block copolymer.

25. The resin-modified composition according to claim 24, wherein the conjugated diene monomer units in the whole block copolymer have a vinyl bond content of not larger than 30% based on the whole conjugated diene monomer units.

26. The resin-modified composition according to claim 25, wherein the ratio of the polymer block A to the polymer block B is in the range of 0.43 to 9.0 by weight.

27. The resin-modified composition according to claim 26, wherein the ratio of the polymer block A to the polymer block B is in the range of 1.0 to 4.0 by weight.

28. The resin-modified composition according to claim 26, wherein the ratio of the conjugated diene monomer units to aromatic vinyl monomer units in the polymer block A is in the range of 90/10 to 60/40 by weight.

29. The resin-modified composition according to claim 26, wherein the conjugated diene monomer units in the whole block copolymer have a vinyl bond content of not larger than 15% based on the whole conjugated diene monomer units.

30. A block copolymer comprising polymer block A comprising conjugated diene monomer units and aromatic vinyl monomer units, and polymer block B comprising conjugated diene monomer units and aromatic vinyl monomer units, wherein said block copolymer is a straight chain block copolymer represented by the following general formula (1) or (2):

A-B                            general formula (1)

wherein A represents polymer block A, and B represents polymer block B,

A-(X$_i$)$_n$—B                      general formula (2)

wherein A represents polymer block A, B represents polymer block B, X$_i$ represents a polymer block comprised only of conjugated diene monomer units or aromatic vinyl monomer units, and n is an integer in the range of 1 to 10;
the ratio of the conjugated diene monomer units to aromatic vinyl monomer units in the polymer block A is in the range of 95/5 to 30/70 by weight, and the ratio of the conjugated diene monomer units to the aromatic vinyl monomer units in the polymer block B is in the range of 5/95 to 30/70 by weight,
wherein the A-B block copolymer of general formula (1) is formed by polymerization and said polymerization is stopped by adding a polymerization stopper; and
said block copolymer of general formula (1) or (2) satisfies the following requirements:
(1) the polymer block A has a glass transition temperature in the range of −88° C. to −45° C. as measured by differential scanning calorimetry,
(2) the polymer block B has a glass transition temperature in the range of 30° C. to 90° C. as measured by differential scanning calorimetry,
(3) the content of aromatic vinyl monomer units in the whole block copolymer is in the range of 3% to 52% by weight based on the weight of the block copolymer,
(4) the aromatic vinyl block ratio in the whole block copolymer is smaller than 69% by weight,
(5) the viscosity of a solution of the block copolymer in styrene with a concentration of 5% by weight as measured at 25° C. is in the range of 30 to 80 mPa·s, and
(6) the ratio of the polymer block A to the polymer block B is in the range of 0.43 to 9.0 by weight.

31. The block copolymer according to claim 30, wherein said polymerization stopper is at least one selected from the group consisting of water, methanol, ethanol, propanol, hydrochloric acid, and citric acid.

* * * * *